US008973087B2

(12) United States Patent
Ritt et al.

(10) Patent No.: US 8,973,087 B2
(45) Date of Patent: Mar. 3, 2015

(54) METHOD AND SYSTEM FOR AUTHORIZING USER INTERFACES

(75) Inventors: Markus Ritt, Linz (AT); Wolfgang Gerteis, Karlsruhe (DE)

(73) Assignee: SAP SE, Walldorf (DE)

( * ) Notice: Subject to any disclaimer, the term of this patent is extended or adjusted under 35 U.S.C. 154(b) by 1523 days.

(21) Appl. No.: 10/843,492

(22) Filed: May 10, 2004

(65) Prior Publication Data

US 2005/0262549 A1  Nov. 24, 2005

(51) Int. Cl.
*H04L 29/06* (2006.01)
*G06F 21/33* (2013.01)

(52) U.S. Cl.
CPC ............ *H04L 63/20* (2013.01); *G06F 21/33* (2013.01); *H04L 63/083* (2013.01); *G06F 2221/2141* (2013.01)
USPC .......................................................... 726/1

(58) Field of Classification Search
USPC ................................ 713/182; 726/2; 709/225
See application file for complete search history.

(56) References Cited

U.S. PATENT DOCUMENTS

| 7,017,051 | B2 * | 3/2006 | Patrick ............................ 726/12 |
| 7,409,710 | B1 * | 8/2008 | Uchil et al. ..................... 713/183 |
| 7,426,475 | B1 * | 9/2008 | Tangellapally et al. ........... 705/3 |
| 2002/0029269 | A1 * | 3/2002 | McCarty et al. ............. 709/225 |
| 2002/0159601 | A1 * | 10/2002 | Bushmitch et al. ........... 380/277 |
| 2003/0097574 | A1 * | 5/2003 | Upton ........................... 713/183 |

* cited by examiner

*Primary Examiner* — Michael S McNally
(74) *Attorney, Agent, or Firm* — Blakely Sokoloff Taylor Zafman, LLP

(57) ABSTRACT

A method to generate a role-based user interface to be presented to a user includes processing a security-relevant portion of user interface code associated with an application, determining a permission by processing application role information pertaining to the user and security policy information, wherein the security policy information is distinct from the user interface code, and associated with the security-relevant portion of the user interface code and with permissions relating to the application, and generating the role-based user interface associated with the application to selectively include a user interface element based upon the determined permission.

22 Claims, 8 Drawing Sheets

US 8,973,087 B2

METHOD AND SYSTEM FOR AUTHORIZING USER INTERFACES

FIELD OF THE INVENTION

One embodiment relates generally to user interfaces and, more specifically, generating user interfaces based on user role information.

BACKGROUND OF THE INVENTION

As organizations move to become more efficient in today's competitive environments, the ability to globalize communication channels for work and education via friendly and easy to use graphical user interfaces becomes more important. The drive to efficiency has led to a trend that includes programming flexibility into universal applications to accommodate various user types. In the case of an online educational program, the users and activities may range from a student accessing online registration material to an instructor posting grades linked to a central database. The desire to streamline operations by providing a universal role-based user interface has presented various security issues, including unauthorized access to the application's user interface controls and their respective functions.

SUMMARY OF THE INVENTION

According to one aspect of the present invention, there is provided a method to generate a role-based user interface to be presented to a user. The method includes processing a security-relevant portion of user interface code associated with an application, determining a permission by processing application role information pertaining to the user and security policy information, and generating the role-based user interface associated with the application to selectively include a user interface element based upon the determined permission. The security policy information is distinct from the user interface code, and associated with the security-relevant portion of the user interface code and with permissions relating to the application.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for generating a role-based user interface to be presented to a user are disclosed. In the following description, for purposes of explanation, numerous specific details are set forth in order to provide a thorough understanding of the present invention. It will be evident, however, to one skilled in the art that the present invention may be practiced without these specific details.

One method to address software security issues within an application involves implementing a JAVA class framework, such as JAAS (Java Authentication and Authorization Service). JAAS functions enable a simple form of authentication against several user management systems using different types of identification mechanisms (e.g., user ID and password, fingerprint, etc.).

During the authentication phase, a user is authenticated via an identification mechanism, such as a user ID and password. As soon as the authentication has been successfully performed, JAAS offers the possibility to perform role-based access to security relevant source code executing outside the user interface.

For this purpose a security policy is defined inside a text file distinct from either the user interface code or the source code executing outside the user interface, that describes which program resources are accessible by which "roles." In other words, the security to determine who can run security relevant portions of source code executing outside the user interface code can be done independently in a different location instead of hard coded into the source code. These security checks are performed during runtime, and therefore JAAS verifies on the basis of the security policy whether the "user" running the code is allowed to perform the particular program action.

By separating source code and security policy it is easier to change access rights without changing the source code. However, this solution does not address the user interface code that renders controls and indicators associated with the application and the user's role. In order to prevent a particular user from viewing security relevant controls, the user interface code is hard coded to only render or not render controls based on a fixed role value. In other words, every time a role has its security policy changed, the user interface code must be rewritten to include the policy change and redistributed to all users. Various embodiments of the present invention address these issues by utilizing a security policy distinct from the source code to determine display characteristics of the user interface.

Figure 1:
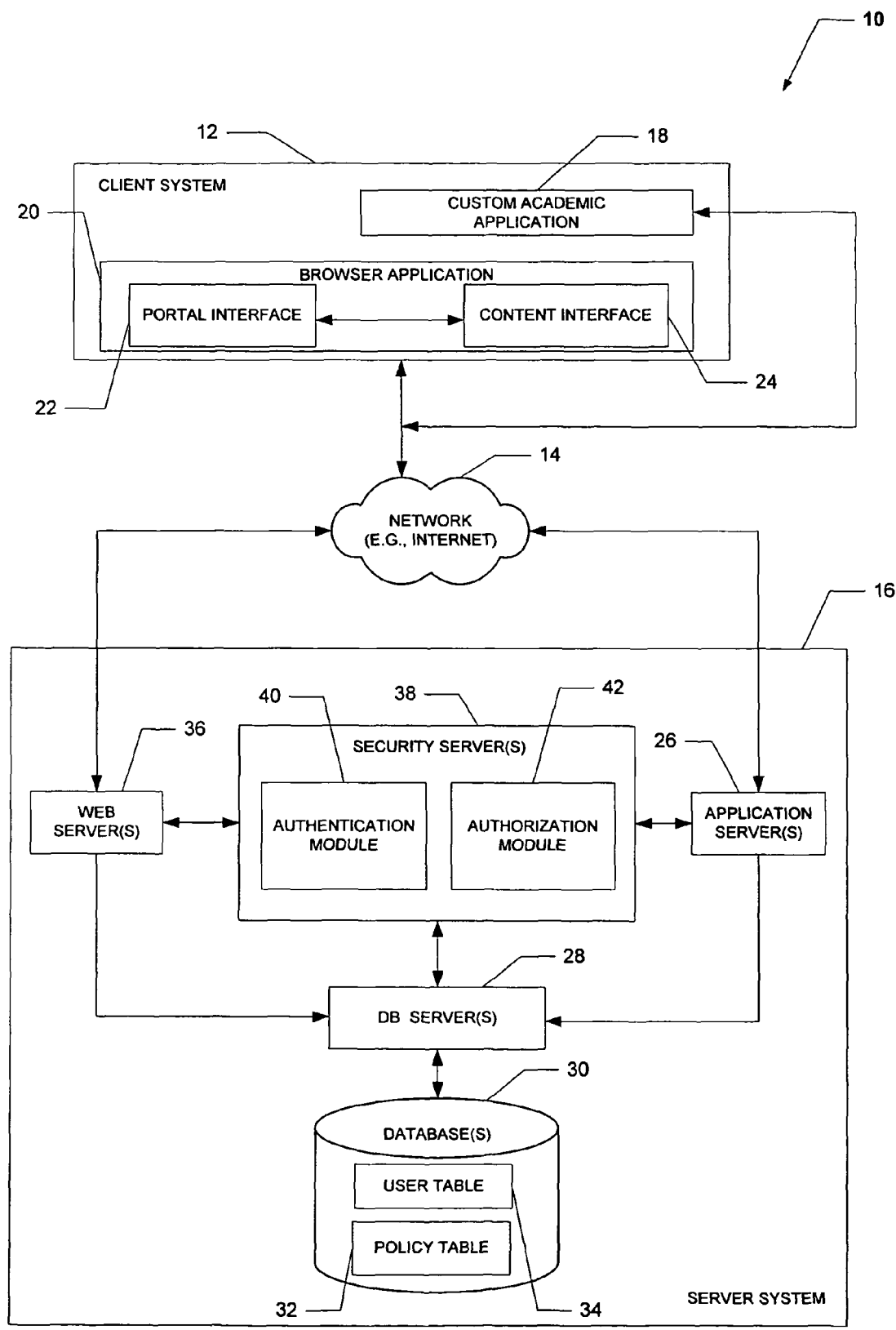
FIG. 1 is a block diagram illustrating a network environment within which an exemplary embodiment of the present invention may be deployed.

FIG. 1 is a block diagram illustrating a network environment 10 within which an exemplary embodiment of the present invention may be deployed. The present invention is not limited to a network deployment, and could equally find application in a stand-alone environment. Further, while the network environment 10 is shown to deploy a client-server architecture, other network architectures (e.g., a peer-to-peer architecture) could also accommodate embodiments of the present invention.

A client system 12 is coupled via a network 14 (e.g., the Internet or an intranet) to a server system 16, so as to facilitate communications (e.g., utilizing any one of a number of well-known network communication protocols, such as HTTP) between the client system 12 and the server system 16. The client system 12 may further host a number of client applications, such as a custom academic application 18 and a browser application 20 (e.g., MS EXPLORER®, developed by Microsoft Corporation of Redmond, of Wash. State), each of which may support a role-based user interface. The custom academic application 18 and/or the browser application 20, according to one embodiment of the present invention, may be used to execute Java server pages or Java scripts that generate a role-based user interface to facilitate user interactions through user interface elements, such as user inputs and displays, and to communicate with the server system 16, as necessary. In varying exemplary embodiments, the role-based user interface may be used in accordance with a computer-based training course, and/or the role-based user interface may be used in accordance with the authoring and design of a computer-based training course. The present invention is not limited to web-based applications and could find equal application with respect to standalone computer-based applications, for example, delivered on a CD (Compact Disk).

In one exemplary embodiment, the portal interface 22 facilitates user access to one or more applications hosted on application server 26, such as a computer-based training course application or a computer-based course authoring application. The application server 26 or the web server 36 may provide data for the role-based user interface based upon a user being authenticated and authorized to have access to various control and display elements associated with application's interface. To be authenticated, a user may submit to security server 38, via network 16, user information, such as a user ID (Identification) and password, via the role-based user interface of the custom academic application 18 or the browser application 20. An authentication module 40, upon receiving the user information, may then access and process user data 34 of database 30 to authenticate the received user information.

The portal interface 22 is shown to invoke the content interface 24 within which content associated with a web-based application is presented to a user in the form of a role-based user interface. Specifically, the content interface 24 may communicate with the one or more applications hosted on application server 26, at least one of which is responsible for the delivery of content to the content interface 24. Both the portal interface 22 and the content interface 24 communicate with the server system 16 via the network 14.

Turning now to the server system 16, one or more application servers 26 are deployed to support one or more applications. The application servers 26 utilize at least one database server 28 to write data to and retrieve data from at least one database 30. The database 30 may, for example, may store security and/or general data, in the exemplary form of policy data 32, and user data 34. The security and/or general data may be stored in any one of a number of forms, such as relational tables or as XML (Extensible Markup Language) data structures. The application servers 26 may also be coupled to one or more web servers 36, so as to facilitate the delivery of web content (e.g., HTML, XML, streaming content, etc.), including content containing embedded code, such as Java, to the portal interface 22 and the content interface 24. The application servers 26 are also shown to have programmatic access, for example via an Application Program Interface (API) (not shown), so as to facilitate interactions between the application servers 26 and the custom application 18 or the browser application 20, and more specifically, its role-based user interface. The application servers 26 and web servers 36 may also be coupled to one or more security servers 38, including an authentication module 40 and an authorization module 42, so as to provide role-based security to and from the client system 12 and the server system 16. The details of the authorization module 42, policy data 32, and role-based security are discussed in further detail below.

Figure 2:
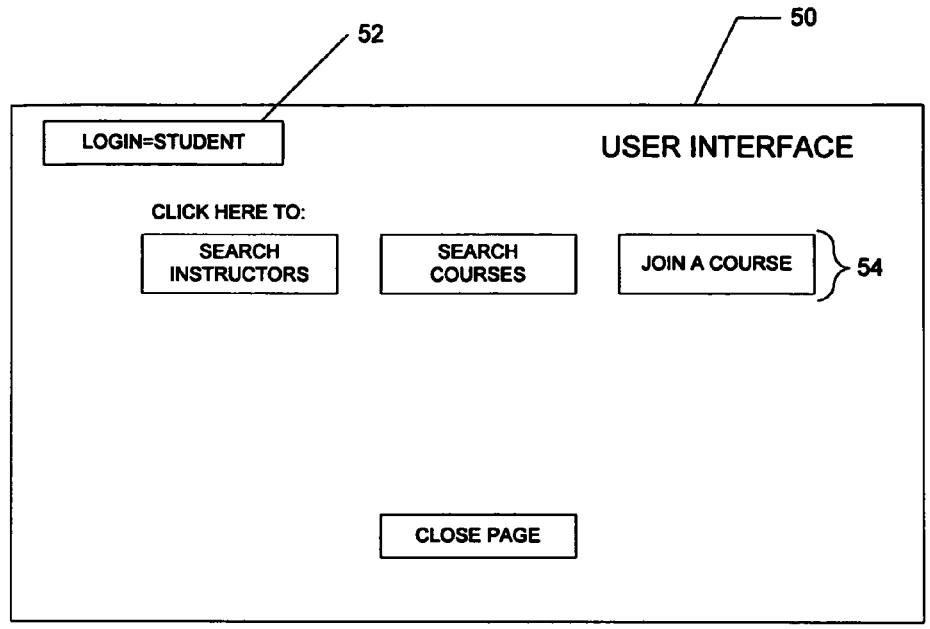
FIG. 2 illustrates a role-based user interface in an exemplary form of an academic application interface, according to one embodiment of the present invention.

FIG. 2 illustrates a role-based user interface 50 in an exemplary embodiment of the present invention, in the form of an academic application interface. According to one embodiment, the role-based user interface 50 includes a display 52 that indicates a user's login role. The login role may be determined at the time the user is authenticated by the authentication module 40 of security server 38. For example, an authenticated user's name may be associated with one or all of the roles that may include, 'STUDENT,' 'ADMIN,' and 'SUPER USER,' each of which may effect user interface element attributes associated with the role-based user interface displayed on client system 12. A particular role, for example, may dictate whether a security relevant portion of the user interface code is executed by either the custom academic application 18 or the browser application 20. In one embodiment, the role of 'STUDENT' may have access to a first control element set 54, which includes each of the controls to 'SEARCH INSTRUCTORS,' 'SEARCH COURSES,' and 'JOIN A COURSE.' Although exemplified on server system 16, the authentication module 40 may reside on client system 12, according to an embodiment of the invention.

Figure 3:
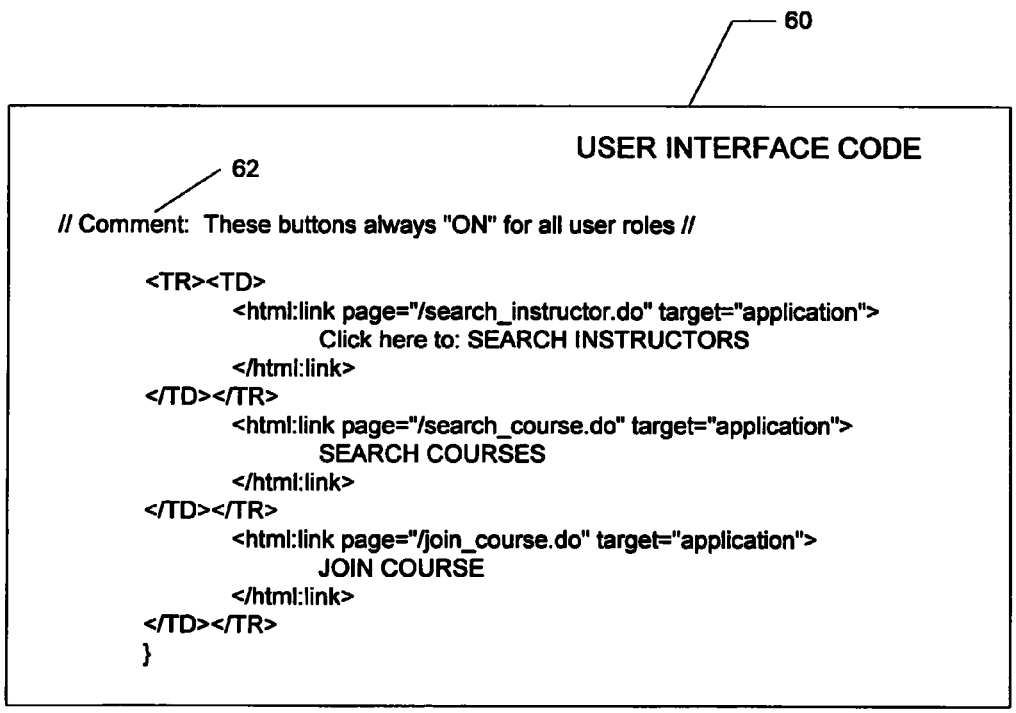
FIG. 3 illustrates user interface code that corresponds to the user interface, according to one embodiment of the present invention.

FIG. 3 illustrates user interface code 60 that corresponds to the user interface 50, according to one embodiment of the present invention. As illustrated by comment 62, the code is written such that the first control element set 54 is visible for all roles. In other words, the code corresponding to buttons on the role-based user interface 50 are not security relevant and therefore do not require prior authorization of the user and role prior to being displayed on the role-based user interface 50.

Figures 4, 5:
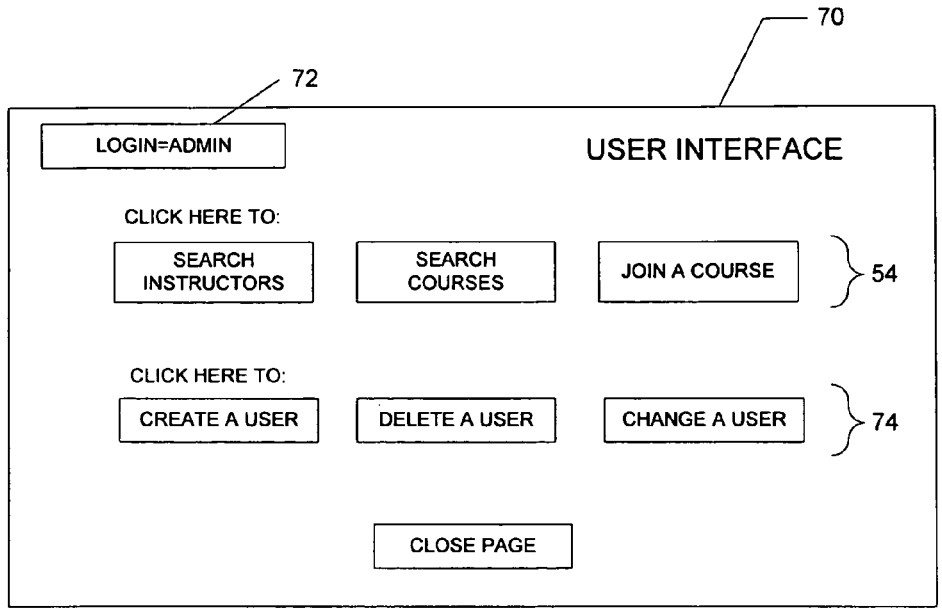
FIG. 4 illustrates a role-based user interface as rendered for the role of 'admin,' according to one embodiment of the present invention.
FIG. 5 illustrates user interface code that corresponds to the security relevant portion of the role-based user interface, according to one embodiment of the present invention.

FIG. 4 illustrates a role-based user interface 70, wherein the role of the user is 'ADMIN,' as illustrated by display 72. As discussed above, the first control element set 54 is displayed for any role and therefore is displayed in the role-based user interface 70. However, for the role of admin, a second control element set 74 is visible and available to the user. This set includes the exemplary controls, 'CREATE A USER,' 'DELETE A USER,' and 'CHANGE A USER.' These controls are deemed security relevant and, as illustrated, are only displayed on the role-based user interface 70 when the user has an appropriate predefined role, such as 'ADMIN'. The permission to execute the security relevant portions is processed at run time, as the user interface code is executed.

FIG. 5 illustrates user interface code 80 that corresponds to the security relevant portion of the role-based user interface 70, according to one embodiment of the present invention. The security relevant portion corresponds to the second control element set 74.

As illustrated in comment line 82, the user interface code 80 is a security relevant section. Code section 84 programmatically determines whether the user has permission to view and otherwise invoke the functions illustrated in the second control element set 74. In code section 84, two parameters, facade 86 and permission constant 88, are passed by authorizer 85 for processing according to security policy information. The authorizer may be a function call, such as a JSP (Java Server Page) or other type of subroutine call outside of the role-based user interface code 80. The facade 86 may contain user data collected during authentication, such as a user ID and corresponding role information. The permission constant 88 is the permission level required to allow execution of the security relevant portion of the role-based user interface code 80. The details of processing the data and returning a permission value based on the security policy information are discussed below. As illustrated in this embodiment of the present invention, user interface code 60 and user interface code 80 are written in Java. It will be appreciated other programmatic languages may be used to implement the present methods of the invention.

Figure 6:
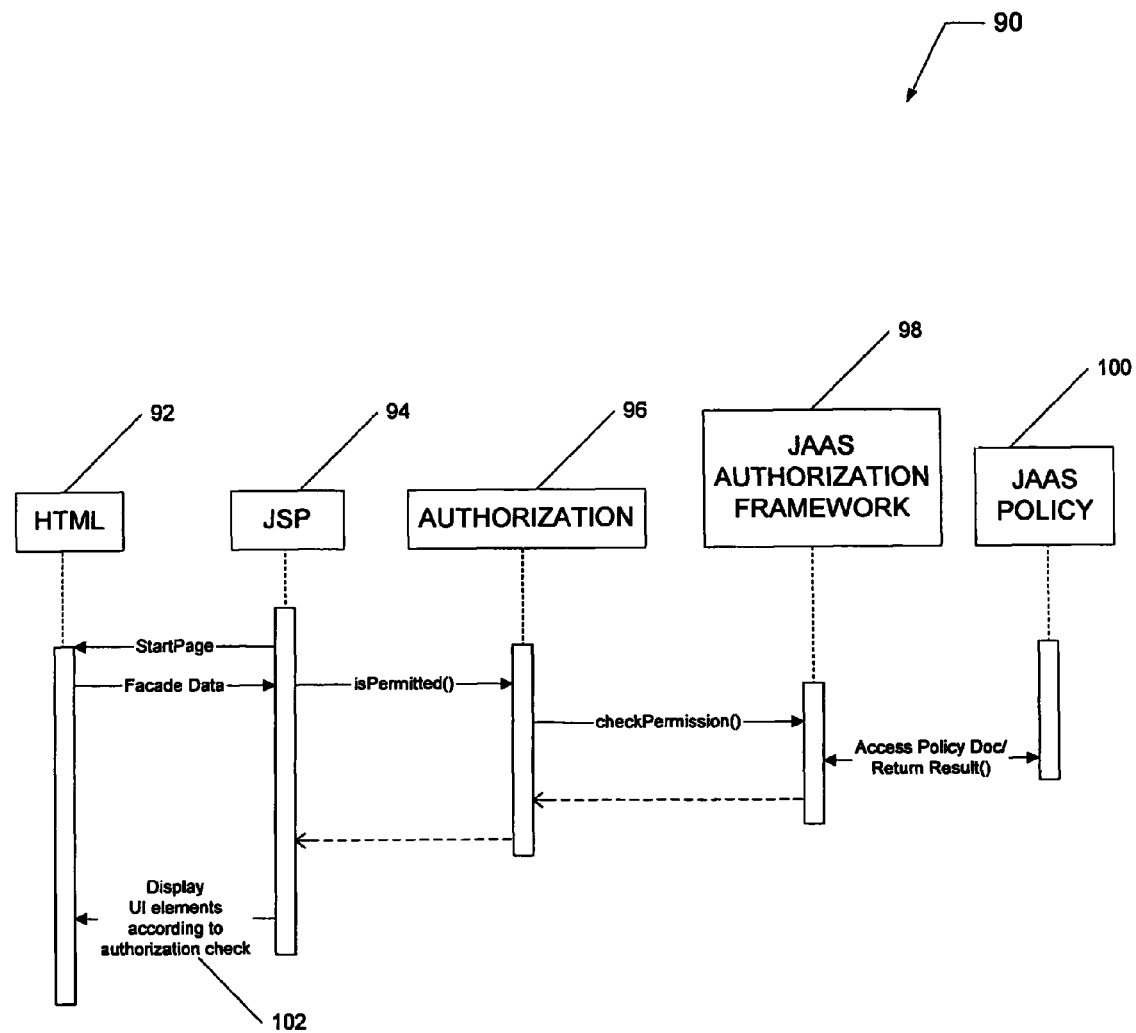
FIG. 6 illustrates a flow diagram of an exemplary Java authorization process to permit execution of a security relevant portion of a role-based user interface, according to one embodiment of the present invention.

FIG. 6 illustrates a simple flow diagram of an exemplary Java authorization process 90 to permit execution of a security relevant portion of a role-based user interface, according to one embodiment of the present invention. A client system 12 displays an HTML (Hypertext Markup Language) start page on either the browser application 20 or custom academic application 18 (operation 92). The HTML start page may provide facade data (operation 94) to a JSP (Java Server Page) for communicating facade data, such as role information (e.g., "ADMIN" or "STUDENT") to web server 36 or application server 26. JSP is a technology for controlling the content or appearance of web pages through the use of servlets, small programs that are specified in the web page and run on a server, such as web server 36 or application server 26, to modify the web page before it is sent to the requesting user. In another embodiment, the web server 36 and/or the application server 26 may be located on the client machine 12.

The web server 36 requests authorization from the authorization module 42 of security server 38 (operation 96). The authorization module 42 may then utilize the JAAS framework (Java Authentication and Authorization Service) to verify a permission level associated with the role of the user corresponding to the communicated facade data (operations 98 and 100). The verification may be against a JAAS policy document found within JAAS policy data 32 of database 30. If the result returned to the HTML startpage authorizes execution of the security relevant portion of the code, the corresponding user interface elements on the role-based user interface are displayed.

Figure 7:
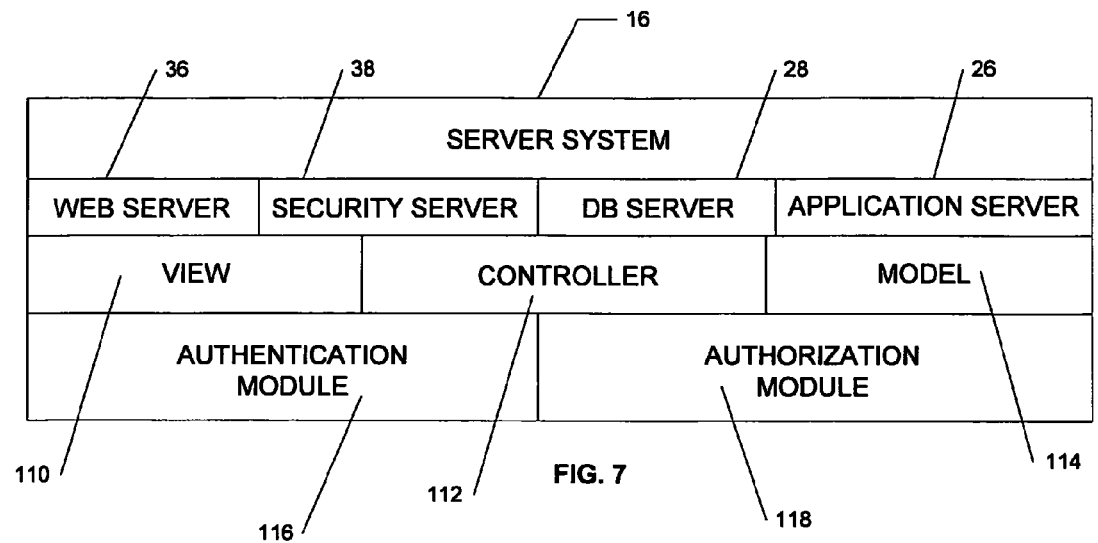
FIG. 7 is a diagram illustrating functional layers of a server system that corresponds to the function of all or portion of the methods discussed herein, according to an embodiment of the present invention.

FIG. 7 is a diagram illustrating functional layers of server system 16 that correspond to the function of all or portion of the methods discussed herein, according to one embodiment of the present invention. The server system includes web server 36, security server 38, database (DB) server 28, and application server 26, and may be deployed as discussed above with reference to FIG. 1. The view 110, controller 112, and model 114 make up a construct for processing security relevant portions of role-based user interface code within server system 16. The view 110 is also shared in part by client system 12 (not shown), wherein user data, during authentication and authorization, is passed from the view 110 to the controller 112. For example, the model 114 represents source code, such as source code called upon by Java Server Pages, and more specifically the Java Authentication and Authorization Service (JAAS) that authenticates and authorizes a user and a user's request to execute instructions either on the model side, the view side of the server system 16, or client system 12, respectively.

Figure 8:
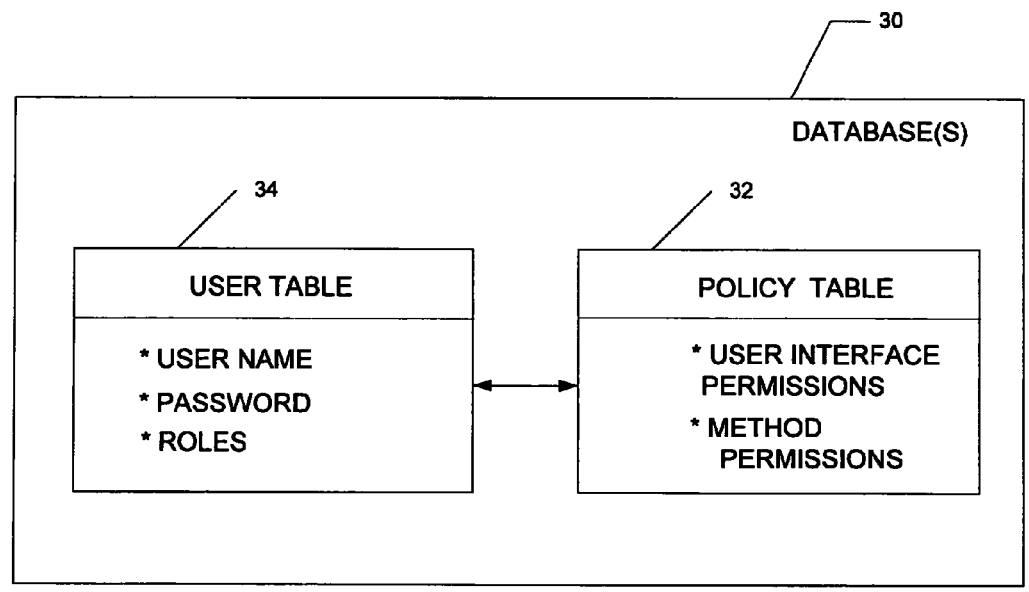
FIG. 8 illustrates a database including a user table containing user information and a policy table containing security policy information, according to one embodiment of the present invention, according to one embodiment of the present invention.

The authentication module 116, controller 112, and model 114, each utilize the DB server 28 to access user table 34 of database 30, as illustrated in FIG. 8, to determine user authentication. For example, user table 34 may contain user data, such as user names, passwords, and roles that must be processed against a user's login information to determine if the user is authenticated.

The authorization module 118, controller 112, and model 114, each utilize the DB server 28 to access policy table 32 of database 30, as illustrated in FIG. 8. For example, the policy table 32 may contain information, such as user interface permissions or method permissions, that when processed with a user's role information, determines whether the user may execute the requested instruction, or whether the security relevant portion of the code within the role-based user interface is executed to reveal additional interface elements, as discussed above.

Figure 9:
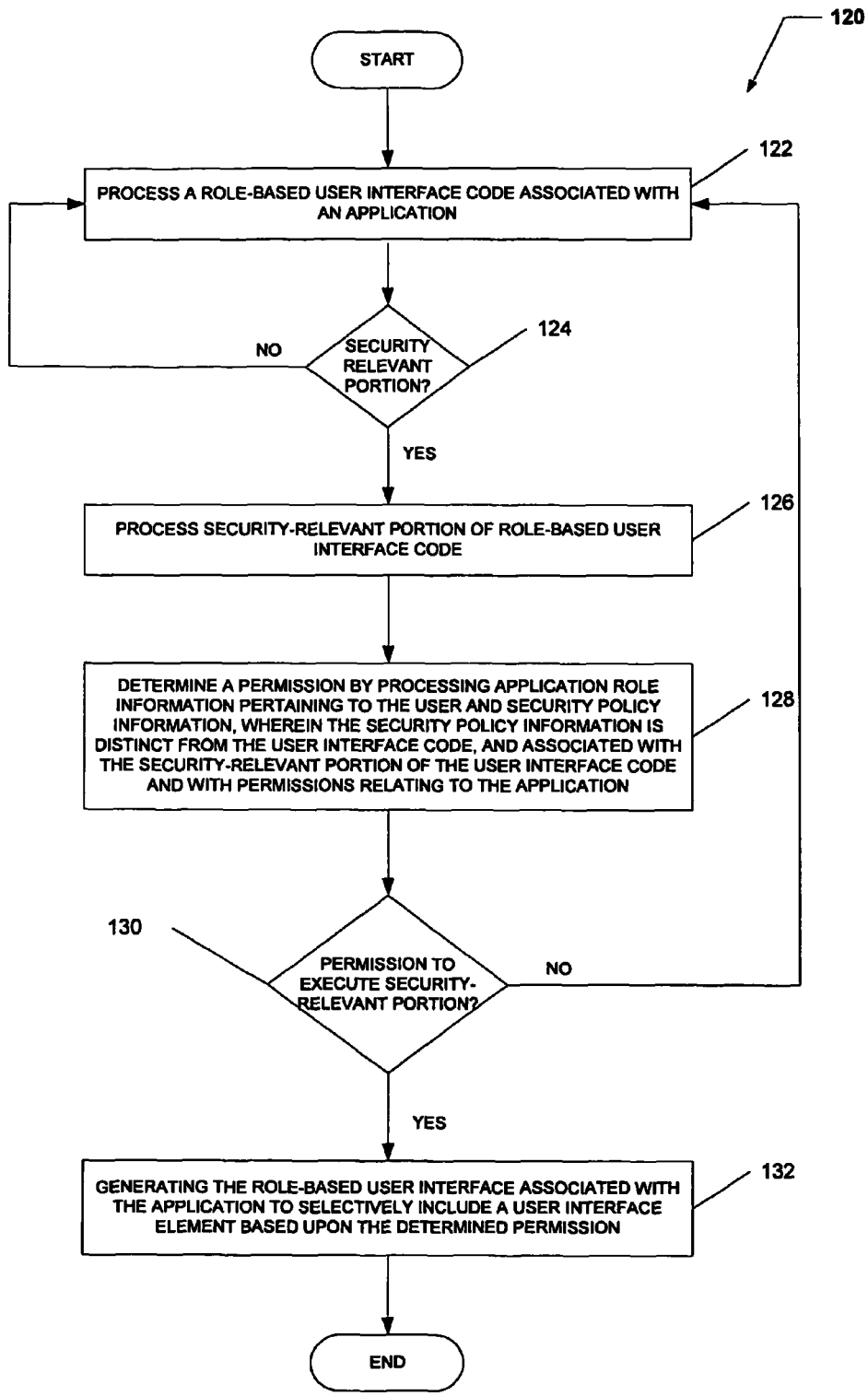
FIG. 9 is a flowchart illustrating a method, according to an exemplary embodiment of the present invention, to generate a role-based user interface by processing user interface code.

FIG. 9 is a flowchart illustrating a method 120, according to an exemplary embodiment of the present invention, to generate a role-based user interface by processing user interface code. The method 120, according to one embodiment, may begin at operation 122 by processing the role-based user interface code associated with either the custom academic application 18 or the browser application 20 operated by a user on the client system 12. If, at operation 124, the code being processed is determined not to be security relevant, the decoding of the role-based user interface code continues at operation 122. However, if the code is determined to be security relevant, the security relevant code is processed at operation 126.

At operation 128, to determine whether a role associated with the user has permission to execute the security relevant code, the application role information pertaining to the user is processed along with security policy information by the authorization module 118. As discussed above, in varying embodiments, the authorization module 118 may be implemented locally on client system 12 or remotely, via network 14, on server system 16. The security policy information is distinct from the user interface code, associated with the security relevant code and with permissions relating to the application, and may be located in the policy table 32 on the database 30.

If permission is denied, at operation 130, based on the user role and the security policy information, the security relevant code is not executed and processing of the role-based user interface code continues at operation 122. If permission is granted, the security relevant code, at operation 132, is executed by the content interface 24 of browser application 20 or by custom academic application 18, to include user elements corresponding to the security relevant code in the role-based user interface.

Figure 10:
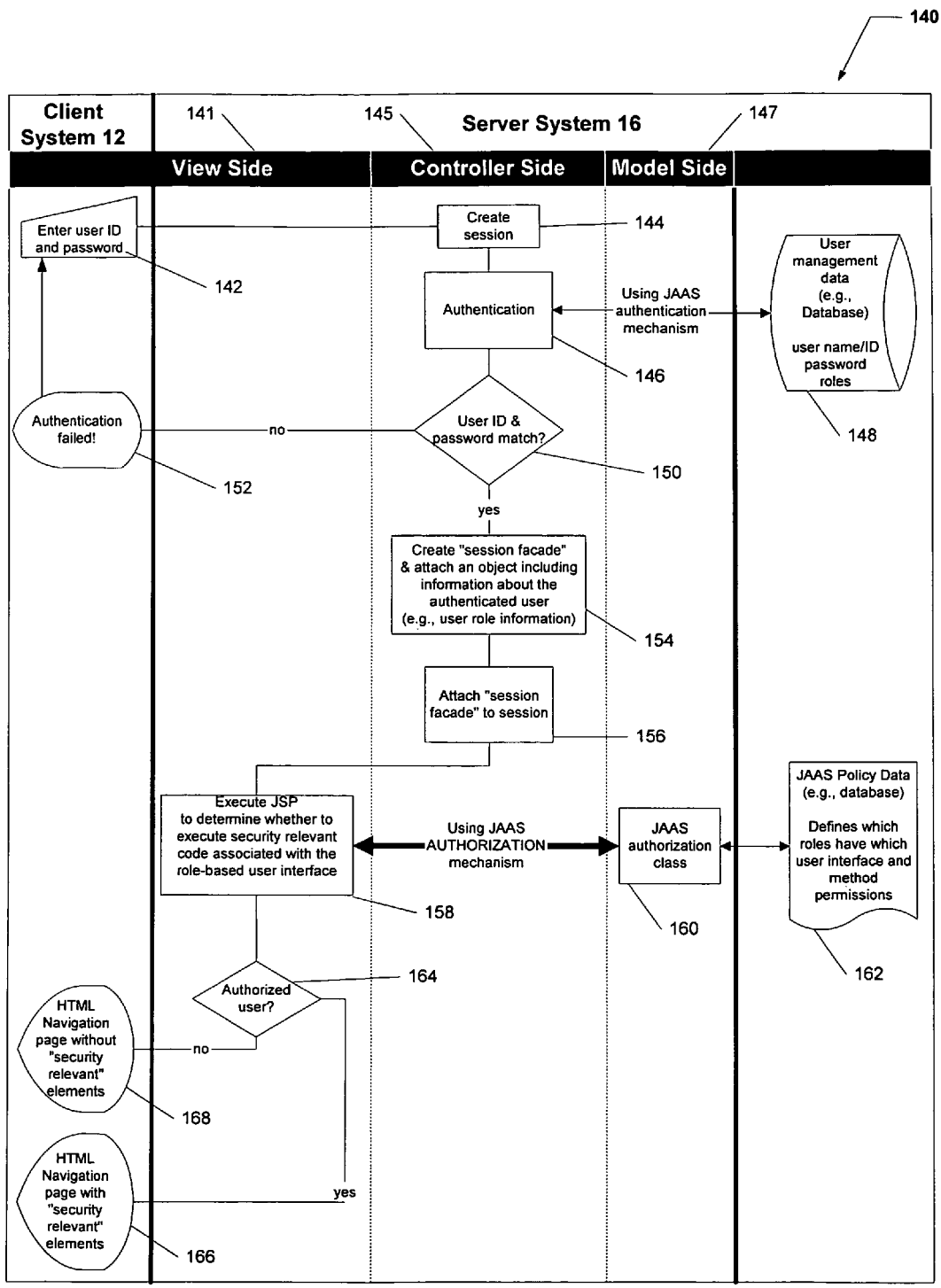
FIG. 10 is a flow diagram, according to an exemplary embodiment of the present invention, illustrating a method to generate a role-based user interface utilizing the Java Authentication and Authorization Service (JAAS)

FIG. 10 is a flow diagram, according to an exemplary embodiment of the present invention, illustrating a method 140 to generate a role-based user interface utilizing the Java Authentication and Authorization Service (JAAS). Client side and server system include view side 141, controller side 145, and method side 147. The method 140 begins on a view side 141 at operation 142 by a user submitting user data for authentication on server system 16, via network 14. The server system 16 may include multiple servers to perform various embodiments of the method described herein, such as the servers described above with reference to FIG. 1. The user data is submitted from client system 12 running at least one of the custom academic application 18 or the browser application 20. At the server system 16 on controller side 143, a session is created at operation 144 that begins the JAAS authentication process for the user at operation 146. The model side 147 includes the JAAS authentication mechanism or code, to access a user management data, such as user table 34 of database 30 (block 148).

Upon retrieving the user management data, it is determined, at operation 150, by the authentication module 40 of security server 38, whether the user ID and password match. If they do not match, then the authentication failed and the user may or may not be offered another opportunity to reenter user ID and password at operation 152. If the user is authenticated based on a user ID and password match, a "session facade" is created by a server, such as web server 36, and may associated with an object that includes information about the authenticated user, such as role information (operation 154). At operation 156, the "session facade" is linked to the session created in operation 144. The web server 36 then executes the JSP (Java Server Page) associated with the role based user interface (operation 158) on the view side 141 of server system 16. The JSP, at operation 160, utilizes the authorization module 42, and more specifically, the JAAS authorization class or code to access the JAAS policy data (block 162) to determine whether the user is authorized to execute the security relevant code of the role-based user interface code (operation 164). The JAAS policy data may be data such as user interface permissions and method permissions as found in policy table 32 of database 30. If the user is authorized, the role based user interface, such as an HTML navigation page executed on browser application 20 or custom academic application 18, will include the user interface elements associated with the execution of the security relevant code (block 166). However, if the user is not authorized based upon the user's role information, the role-based user interface (block 168) will not include the user interface elements associated with the security relevant code.

Figure 11:
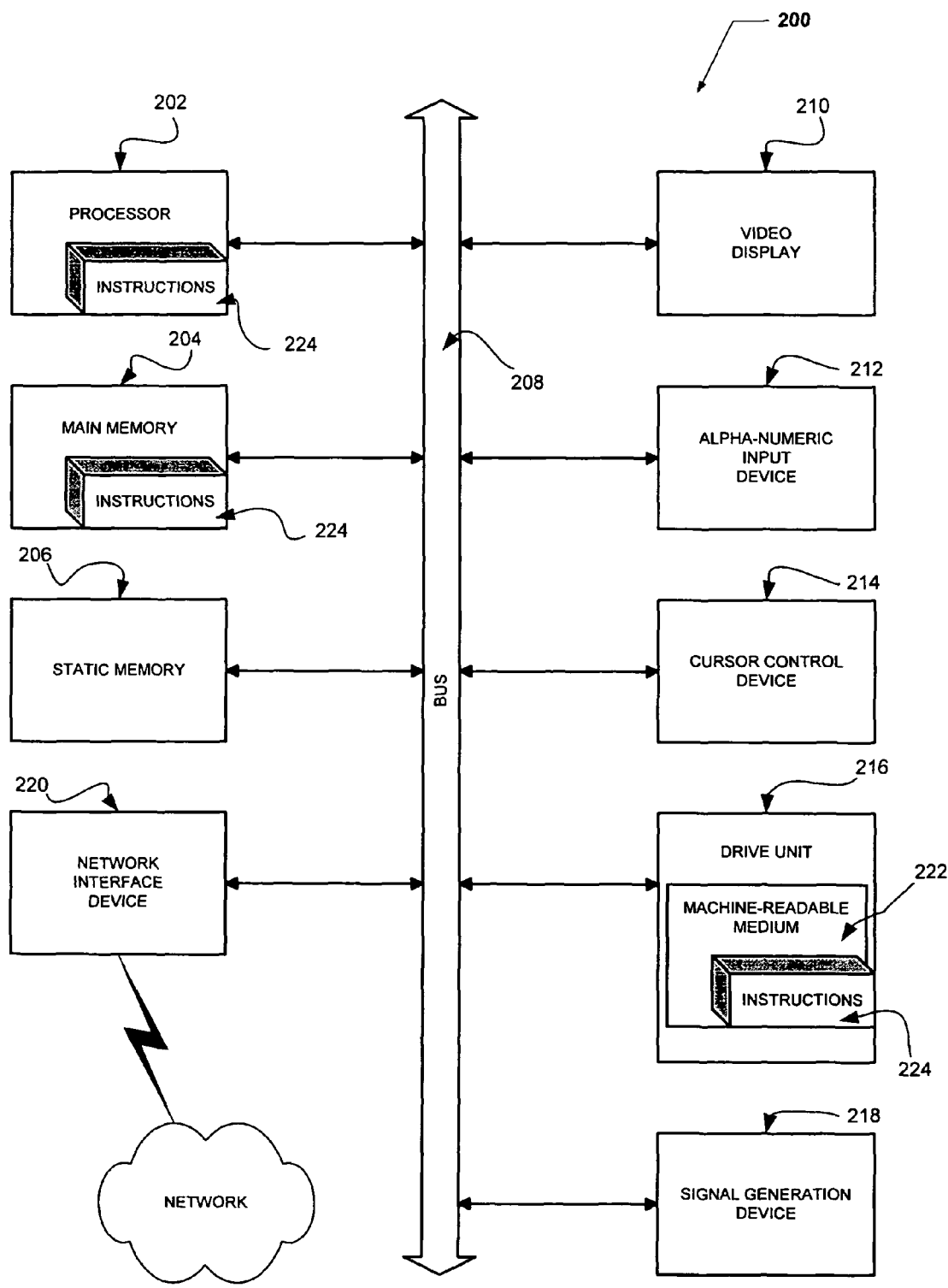
FIG. 11 shows a diagrammatic representation of a machine in the exemplary form of a computer system within which a set of instructions, for causing the machine to perform any one or more of the methodologies discussed herein, may be executed.

FIG. 11 shows a diagrammatic representation of a machine in the exemplary form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 292 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, a method and system for generating a role-based user interface to be presented to a user have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   authenticating a user;
   in response to authenticating the user, accessing a user interface (UI) code, the UI code to generate a UI page, the UI page including instructions to generate a graphical user interface (GUI) for the user, the UI code including a security relevant portion of the UI code to generate a security relevant UI page element, the security relevant UI page element including instructions to generate a security relevant GUI element related to an application; and
   in response to accessing the UI code, executing the UI code to generate the UI page, the executing the UI code including executing a first portion of the UI code to include a UI page element in the UI page, wherein the executing the first portion of the UI code is independent of whether or not the user has an authorization to access the application, the executing the UI code further including determining whether the user has the authorization to access the application, the determining based on a security policy and user role information, the executing the UI code further including performing one of
   with a processor of a computing device, executing the security relevant portion of the UI code to include the security relevant UI page element in the UI page, the executing the security relevant portion of the UI code in response to determining that the user has the authorization to access the application, and preventing executing the security relevant portion of the UI code to prevent an including of the security relevant UI page element in the UI page, the preventing executing the security relevant portion of the UI code in response to determining that the user does not have the authorization to access the application.

2. The method of claim 1, further comprising accessing the security policy from a security policy document.

3. The method of claim 1, further comprising:
receiving by a server the user role information from a client system; and
sending the UI page from the server to the client system to be used by the client system to generate the GUI.

4. The method of claim 3, wherein:
determining whether the user has the authorization further comprises the server determining whether the user has the authorization; and
generating the UI page further comprises the server generating the UI page.

5. The method of claim 1, wherein including the security relevant UI page element further comprises including instructions to display at least one of a control, a dialog box, a menu, and an indicator.

6. The method of claim 1, wherein generating the UI page further comprises calling Java Server Page functions.

7. The method of claim 6, wherein making a decision whether to grant the user authorization to view the application information further comprises calling Java Authentication and Authorization Service functions.

8. The method of claim 1, wherein generating the UI page comprises generating an HTML page.

9. The method of claim 1, wherein the executing the UI code includes the preventing executing the security relevant portion of the UI code to prevent the including of the security relevant UI page element in the UI page.

10. The method of claim 9, wherein the executing the UI code further includes executing a second security relevant portion of the UI code to include a second security relevant UI page element in the UI page, the executing the second security relevant portion of the UI code in response to determining that the user has the authorization to access the application.

11. A system comprising:
processor circuitry;
an authentication module executing with the processor circuitry, the authentication module configured to authenticate a user;
a web service module coupled to the authentication module, the web service module executing with the processor circuitry, the web service module configured to access a user interface (UI) code in response to the authenticating the user, the UI code to generate a UI page, the UI page including instructions to generate a graphical user interface (GUI) for a user, the UI code including a security relevant portion of the UI code to generate a security relevant UI page element, the security relevant UI page element including instructions to generate a security relevant UI element related to an application, the web service module to generate the UI page by executing the UI code, the executing the UI code including executing a first portion of the UI code to include a UI page element in the UI page, wherein the executing the first portion of the UI code is independent of whether or not the user has an authorization to access the application, the executing the UI code further including one of executing the security relevant portion of the UI code to include the security relevant UI page element in the UI page, the executing the security relevant portion of the UI code in response to determining that the user has the authorization to access the application, and
preventing executing the security relevant portion of the UI code to prevent an including of the security relevant UI page element in the UI page, the preventing executing the security relevant portion of the UI code in response to determining that the user does not have the authorization to access the application; and
an authorization module to determine and to indicate to the executing the UI code whether the user has the authorization to access the application, the determining based on a security policy and user role information.

12. The system of claim 11, further comprising a data base server with a security policy document containing the security policy.

13. The system of claim 11, wherein the authorization module is hosted on a security server separate from a web server that hosts the web services module.

14. The system of claim 13,
wherein the web server further to receive the user role information from a client system; and
wherein the web server further to send the UI page to the client system to be used to generate the GUI.

15. The system of claim 11, wherein the security relevant UI page element includes instructions to display at least one of a control, a dialog box, a menu, and an indicator.

16. The system of claim 11, wherein the UI code includes a Java Server Page function call.

17. The system of claim 11, wherein the authorization module includes a Java Authentication and Authorization Service (JAAS) authorization function to use to in determining whether the user has the authorization to access the application.

18. The system of claim 17, wherein the security relevant UI code element includes a call to the Java Authentication and Authorization Service (JAAS) authorization function.

19. The system of claim 11, further comprising an authentication module including a Java Authentication and Authorization Service (JAAS) authentication function.

20. The system of claim 19, wherein the UI code includes a call to the Java Authentication and Authorization Service (JAAS) authentication function.

21. A non-transitory machine-accessible medium that provides instructions that, if executed by a machine, will cause the machine to perform operations including:
authenticating a user;
in response to authenticating the user, accessing a user interface (UI) code, the UI code to generate a UI page, the UI page including instructions to generate a graphical user interface (GUI) for the user, the UI code including a security relevant portion of the UI code to generate a security relevant UI page element, the security relevant UI page element including instructions to generate a security relevant UI element related to an application;
in response to accessing the UI code, executing the UI code to generate the UI page, the executing the UI code including executing a first portion of the UI code to include a UI page element in the UI page, wherein the executing the first portion of the UI code is independent of whether or not the user has an authorization to access the application, the executing the UI code further including determining whether the user has the authorization to access the application, the determining based on a security policy and user role information, the executing the UI code further including performing one of executing the security relevant portion of the UI code to include the security relevant UI page element in the UI page, the executing the security relevant portion of the UI code in response to determining that the user has the authorization to access the application, and preventing executing the security relevant portion of the UI code to prevent an including of the security relevant UI page element in the UI page, the preventing executing the security relevant portion of the UI code in response to determining that the user does not have the authorization to access the application.

22. A system comprising:

a means for authenticating a user;

a means for accessing a user interface (UI) code in response to the authenticating the user, the UI code to generate a UI page, the UI page including instructions to generate a UI for the user, the UI code including a security relevant portion of the UI code to generate a security relevant UI page element, the security relevant UI page element including instructions to generate a security relevant UI element related to an application;

a means for executing the UI code in response to the accessing the UI code to generate the UI page, the means for executing the UI code including means to execute a first portion of the UI code to include a UI page element in the UI page, wherein the executing the first portion of the UI code is independent of whether or not the user has an authorization to access the application, the means for executing the UI code further including means for determining whether the user has the authorization to access the application, the determining based on a security policy and user role information, the means for executing the UI code further including one of means for executing the security relevant portion of the UI code to include the security relevant UI page element in the UI page, the executing the security relevant portion of the UI code in response to determining that the user has the authorization to access the application, and means for preventing executing the security relevant portion of the UI code to prevent an including of the security relevant UI page element in the UI page, the preventing executing the security relevant portion of the UI code in response to determining that the user does not have the authorization to access the application; and a means for making a determination, in response to the executing the UI code, whether the user has the authorization to access the application, the determination based on a security policy and user role information.

\* \* \* \* \*